(12) United States Patent
Yang et al.

(10) Patent No.: US 12,082,197 B2
(45) Date of Patent: Sep. 3, 2024

(54) METHOD AND DEVICE FOR TRANSMITTING AND RECEIVING SIGNALS IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 622 days.

(21) Appl. No.: 17/275,391

(22) PCT Filed: Nov. 4, 2019

(86) PCT No.: PCT/KR2019/014834
§ 371 (c)(1),
(2) Date: Mar. 11, 2021

(87) PCT Pub. No.: WO2020/091559
PCT Pub. Date: May 7, 2020

(65) Prior Publication Data
US 2022/0053482 A1    Feb. 17, 2022

(30) Foreign Application Priority Data

Nov. 2, 2018 (KR) .................... 10-2018-0133872
Jan. 11, 2019 (KR) .................... 10-2019-0004179

(51) Int. Cl.
*H04W 72/21* (2023.01)
*H04L 5/00* (2006.01)
(Continued)

(52) U.S. Cl.
CPC ........... *H04W 72/21* (2023.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS 9,854,569 B2 * 12/2017 Yang ..................... H04W 72/21
2011/0235599 A1 * 9/2011 Nam ...................... H04W 72/02
370/329

(Continued)

OTHER PUBLICATIONS

PCT International Application No. PCT/KR2019/014834, International Search Report dated Feb. 7, 2020, 18 pages.
(Continued)

*Primary Examiner* — Liem H. Nguyen
(74) *Attorney, Agent, or Firm* — LEE, HONG, DEGERMAN, KANG & WAIMEY

(57) ABSTRACT

A method and a device for transmitting and receiving signals in a wireless communication system, according to an embodiment of the present invention, are configured to set an REG-interlace consisting of M RBs and N symbols for PUCCH transmission, and select a minimum number of symbols ($N_{min}$) required for the PUCCH transmission from among the N symbols, on the basis of an actual UCI payload size required for the PUCCH transmission being smaller than the maximum UCI payload size that can be transmitted through a PUCCH resource, to thereby transmit the PUCCH.

11 Claims, 12 Drawing Sheets

(51) Int. Cl.
  *H04L 41/0803* (2022.01)
  *H04W 72/0446* (2023.01)
  *H04W 76/30* (2018.01)

(52) U.S. Cl.
  CPC ......... *H04L 41/0803* (2013.01); *H04W 76/30* (2018.02); *H04W 72/0446* (2013.01)

(56) References Cited

U.S. PATENT DOCUMENTS

| | | | |
|---|---|---|---|
| 2011/0242997 A1 | 10/2011 | Yin | |
| 2017/0164352 A1* | 6/2017 | Yang | H04W 72/21 |
| 2017/0347353 A1* | 11/2017 | Yerramalli | H04L 5/0053 |
| 2018/0139735 A1* | 5/2018 | Akkarakaran | H04L 5/0053 |
| 2018/0192416 A1 | 7/2018 | Yin et al. | |
| 2018/0249458 A1 | 8/2018 | He et al. | |
| 2018/0279291 A1* | 9/2018 | Tiirola | H04L 25/0224 |
| 2018/0368137 A1* | 12/2018 | Yin | H04L 5/0091 |
| 2019/0124647 A1* | 4/2019 | Li | H04L 1/1825 |
| 2020/0036473 A1* | 1/2020 | Nemeth | H04L 1/203 |
| 2020/0052835 A1* | 2/2020 | Xiong | H04L 1/1819 |
| 2020/0059924 A1* | 2/2020 | Matsumura | H04L 27/2607 |
| 2020/0077424 A1* | 3/2020 | Baldemair | H04L 27/2602 |
| 2021/0092732 A1* | 3/2021 | Lee | H04L 1/1607 |
| 2021/0160909 A1* | 5/2021 | Matsumura | H04W 72/21 |
| 2022/0338182 A1* | 10/2022 | Wengerter | H04L 1/0079 |
| 2022/0346092 A1* | 10/2022 | Choi | H04L 5/1469 |
| 2023/0058150 A1* | 2/2023 | Dimou | H04L 5/0053 |
| 2023/0079976 A1* | 3/2023 | Choi | H04L 5/0092 370/329 |

OTHER PUBLICATIONS

5G; NR; "Physical layer procedures for control (3GPP TS 38.213 version 15.3.0 Release 15)," ETSI TS 138 213 V15.3.0, Oct. 2018, 104 pages.

Huawei et al., "Review Summary for AI 7.1.3.2 related to long Pucch," R1-1811970, 3GPP TSG RAN WG1 Meeting #94bis, Sep. 2018, 32 pages.

* cited by examiner

[Fig .1]
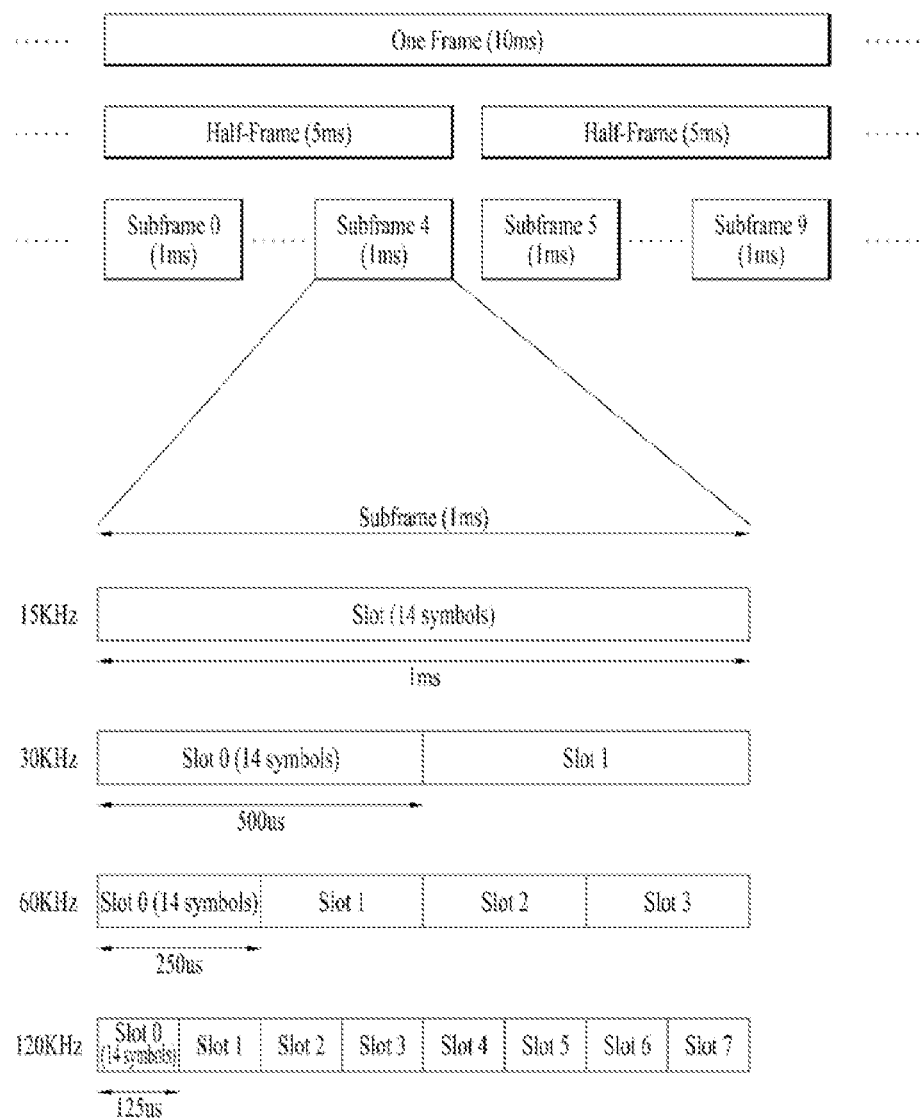

[Fig .2]
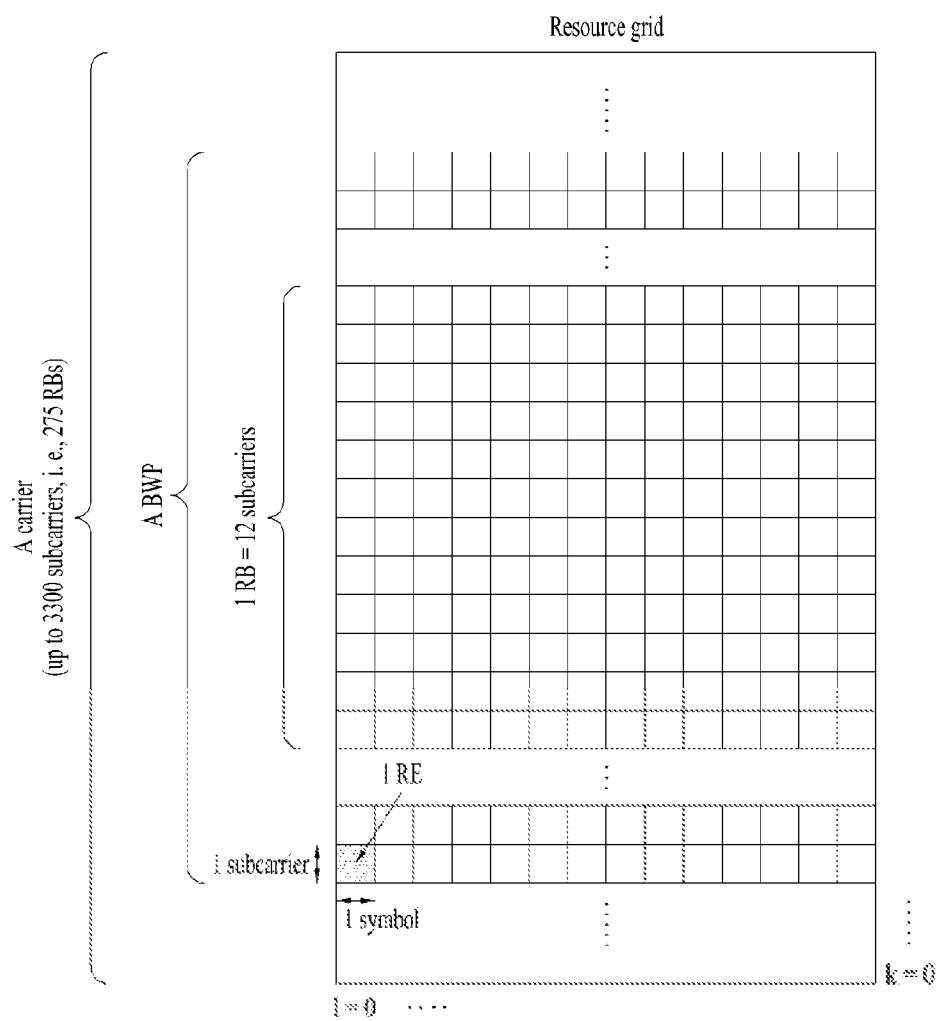

[Fig .3]
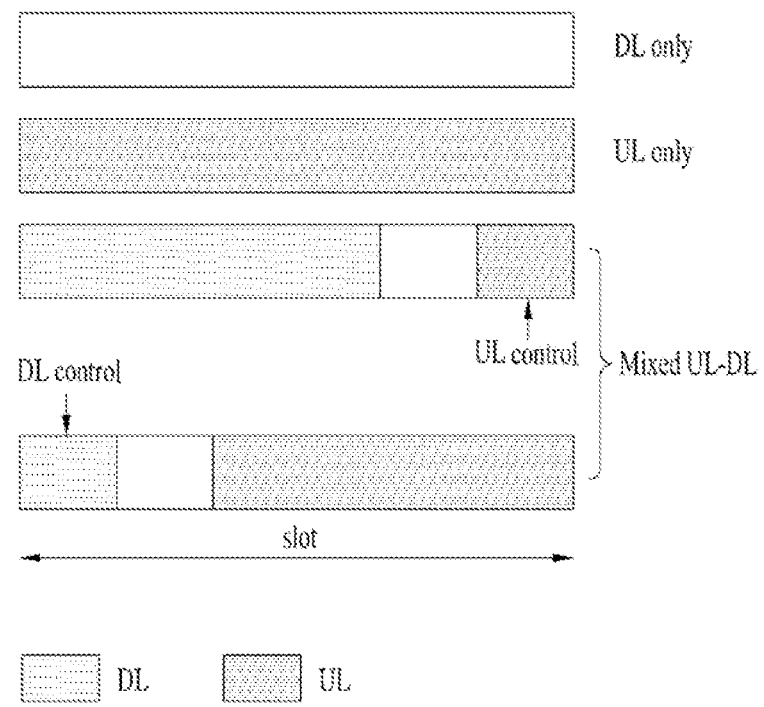

[Fig. 4]
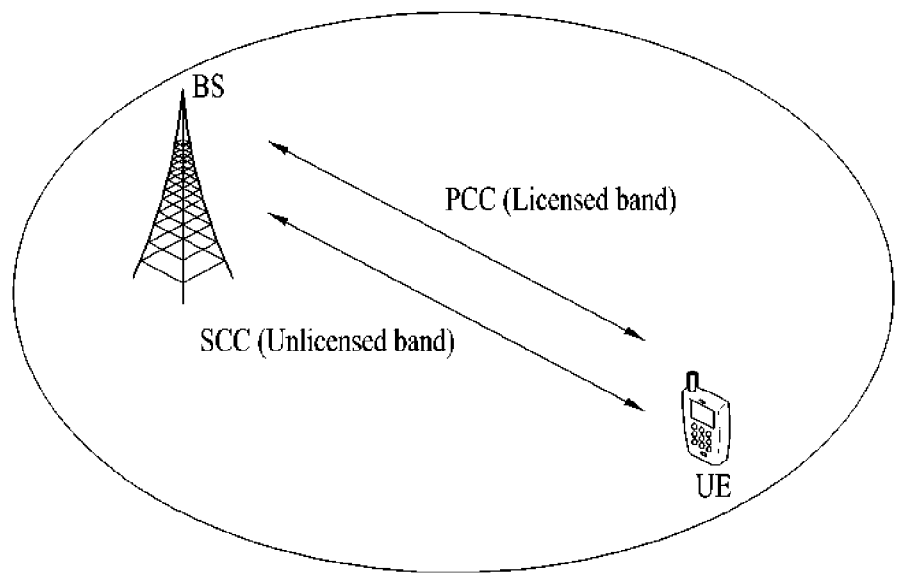
(a) Carrier aggregation between L-band and U-band
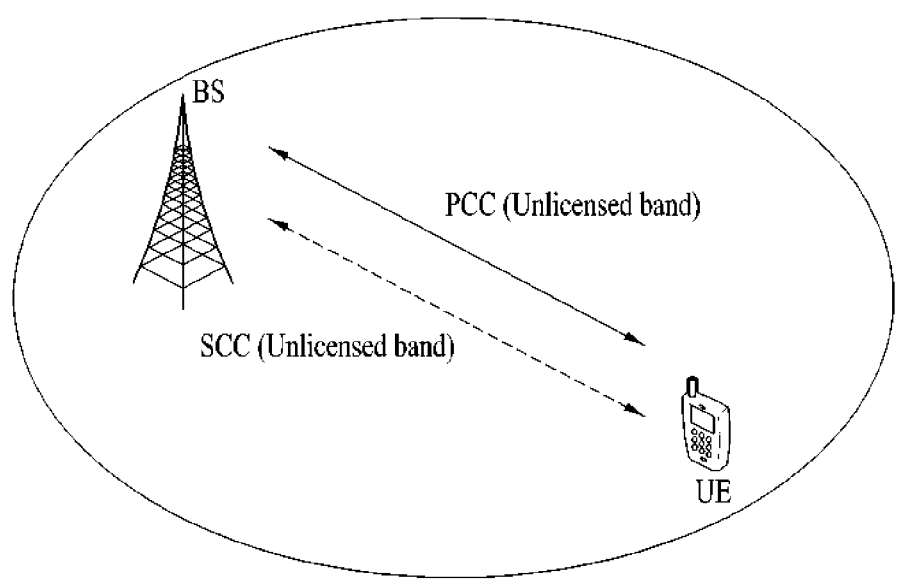
(b) Standalone U-band(s)

[Fig .5]
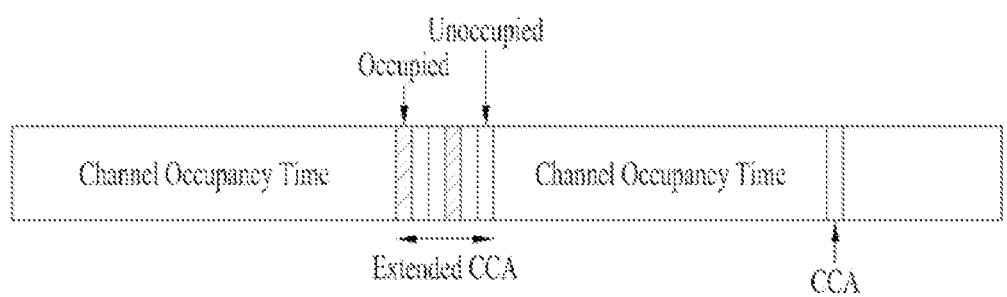
[Fig .6]
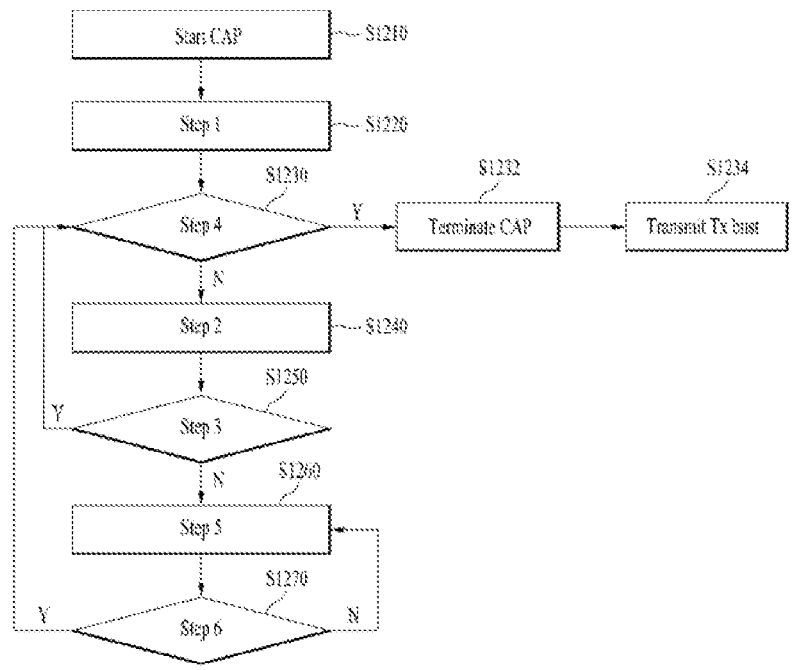

【Fig .7】
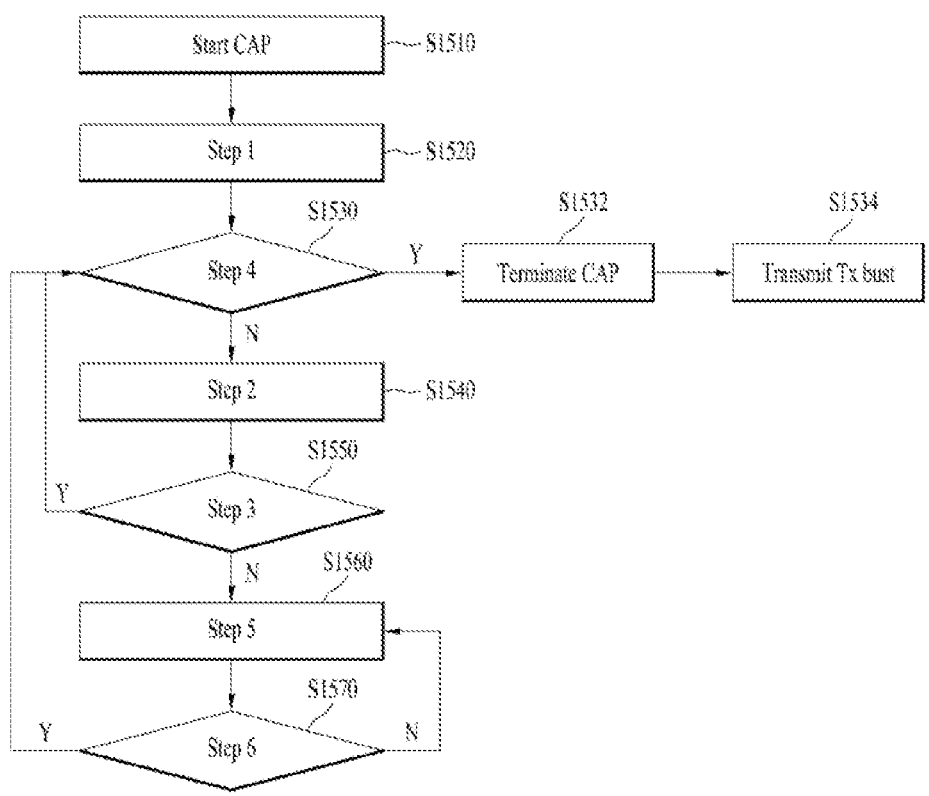

[Fig. 8]
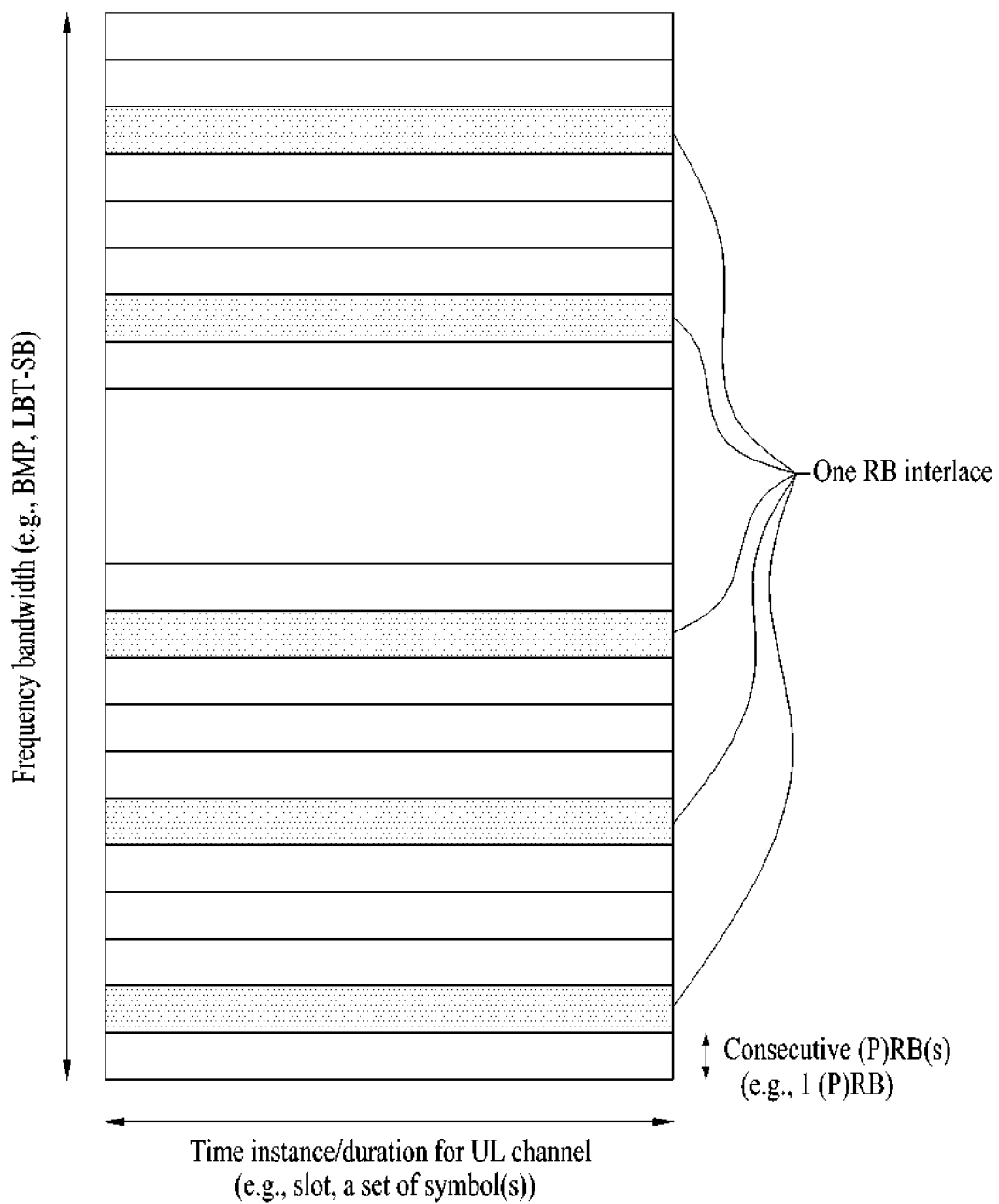

【Fig .9】
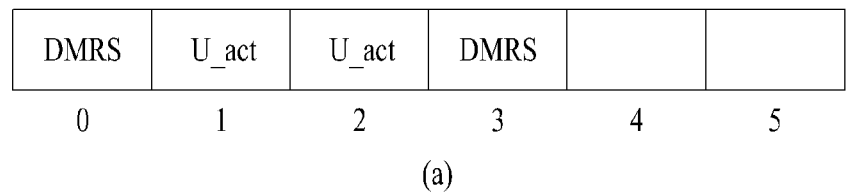
(a)
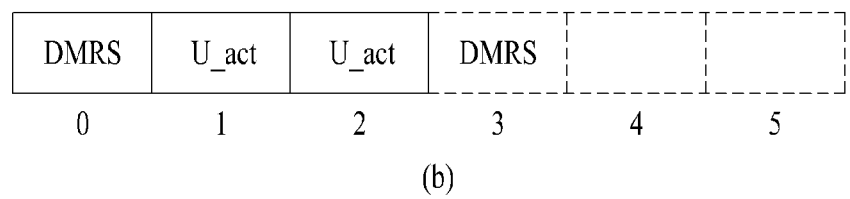
(b)
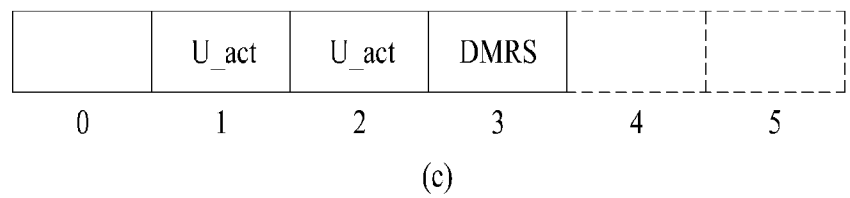
(c)

[Fig. 10]
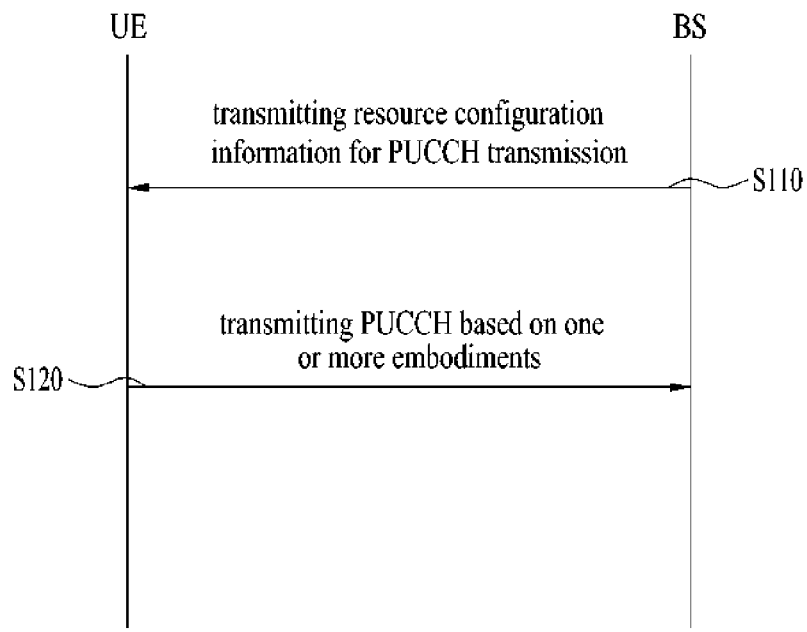
[Fig. 11]
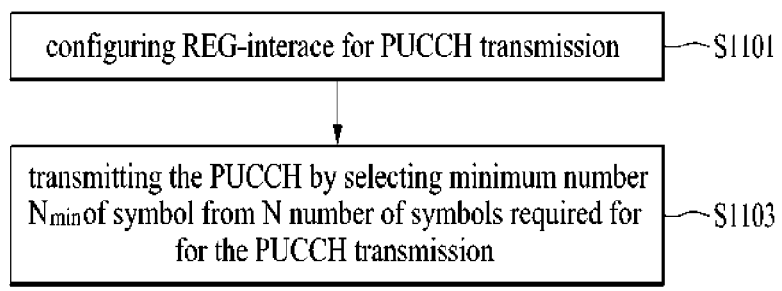

[Fig. 12]
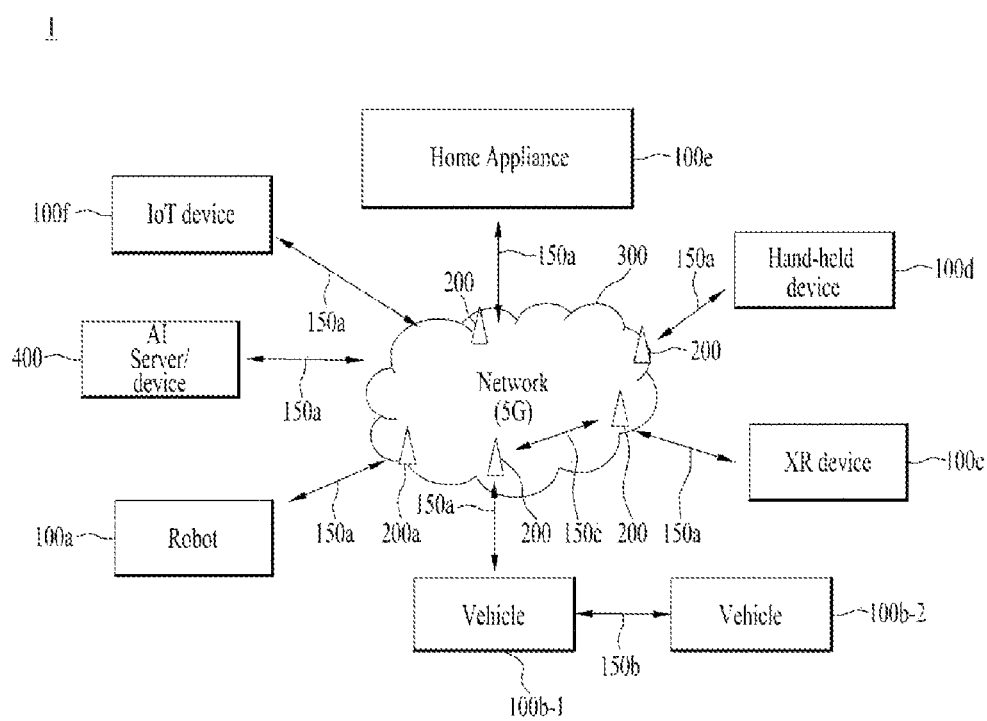

【Fig.13】
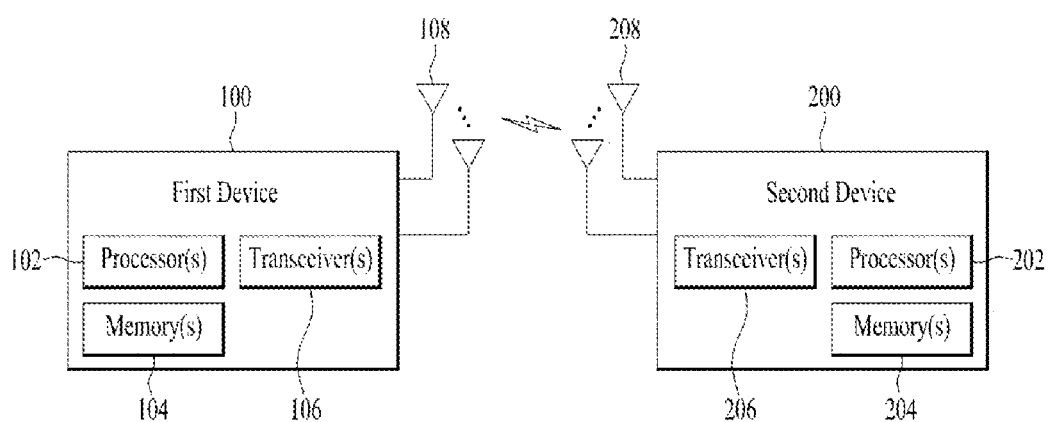
【Fig.14】
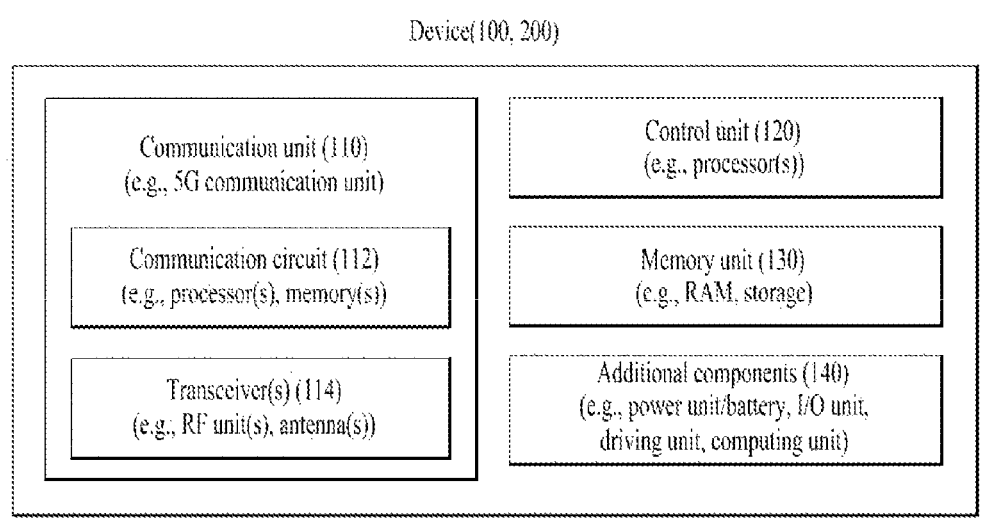

[Fig. 15]
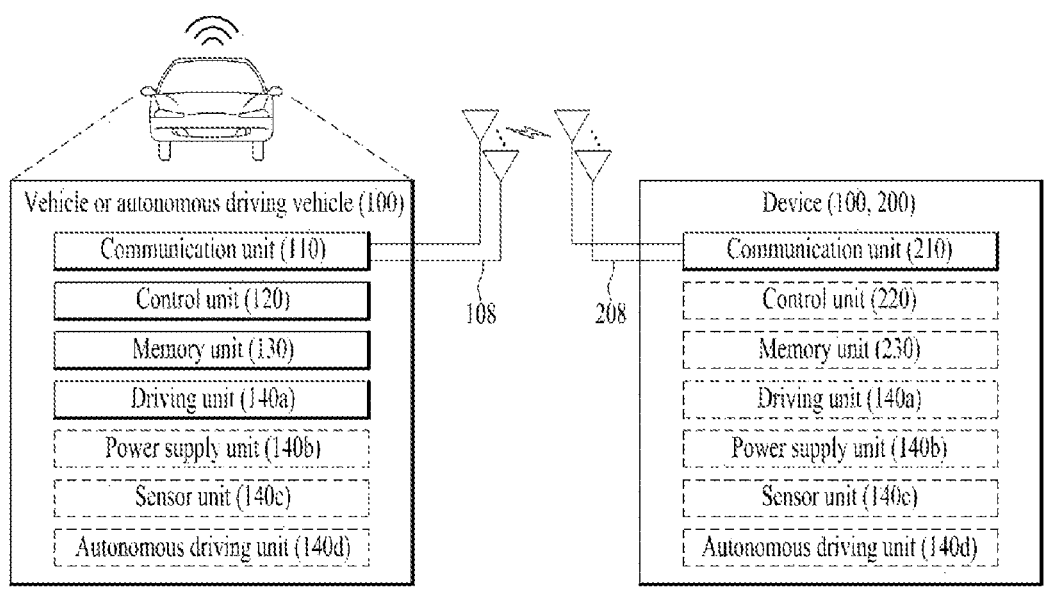

METHOD AND DEVICE FOR TRANSMITTING AND RECEIVING SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2019/014834, filed on Nov. 4, 2019, which claims the benefit of earlier filing date and right of priority to Korean Application Nos. 10-2018-0133872, filed on Nov. 2, 2018, and 10-2019-0004179, filed on Jan. 11, 2019, the contents of which are all incorporated by reference herein in their entireties.

TECHNICAL FIELD

The present disclosure relates to a method and apparatus used in a wireless communication system, and more particularly, to a method and apparatus for transmitting and receiving a control signal and data signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

Provided are a method and apparatus for transmitting a PUCCH signals efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for receiving a signal in a wireless communication system.

In one aspect of the present disclosure, a method of transmitting and receiving a signal by a communication device in a wireless communication system is provided. The method may include: configuring a resource element group interlace (REG-interlace) including M resource blocks (RBs) and N symbols for transmission of a physical uplink control channel (PUCCH); and based on that an actual uplink control information (UCI) payload size required for the PUCCH transmission is smaller than a maximum UCI payload size capable of being transmitted on a PUCCH resource, transmitting the PUCCH by selecting a minimum number ($N_{min}$) of symbols required for the PUCCH transmission among the N symbols.

In another aspect of the present disclosure, a communication device for transmitting and receiving a signal in a wireless communication system is provided. The communication device may include: at least one transceiver; at least one processor; and at least one memory operably connected to the at least one processor and configured to store instructions that, when executed, cause the at least one processor to perform operations including: configuring an REG-interlace including M RBs and N symbols for transmission of a PUCCH; and based on that an actual UCI payload size required for the PUCCH transmission is smaller than a maximum UCI payload size capable of being transmitted on a PUCCH resource, transmitting the PUCCH by selecting a minimum number ($N_{min}$) of symbols required for the PUCCH transmission among the N symbols.

In the method or device, the maximum UCI payload size may be calculated based on M×N×N_SC×Qm×R_max, where N_SC denotes a number of subcarriers for each RB, Qm denotes a parameter configured based on a modulation scheme, and R_max denotes a maximum UCI coding rate. The device/processor may select $N_{min}$ as a minimum value of N satisfying that the maximum UCI payload size is greater than or equal to the actual UCI payload size.

In the method or device, the device/processor may select $N_{min}$ by dropping transmission from a symbol located last in a time domain among the N symbols.

In the method or device, the device/processor may select $N_{min}$ while fixing M.

In the method or device, the device/processor may reduce the M RBs for the PUCCH transmission to a threshold ($M_{th}$) and select $N_{min}$ based on that the actual UCI payload size is smaller than a maximum UCI payload size calculated based on $M_{th}$ RBs.

In the method or device, the device/processor may transmit the PUCCH in the minimum number of symbols and demodulation reference signal (DMRS) symbols adjacent to the minimum number of symbols.

In the method or device, transmission of DMRS symbols not located first in a time domain among the DMRS symbols adjacent to the minimum number of symbols may be dropped.

In the method or the device, the communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication device may perform transmission of a PUCCH more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 illustrates a radio frame structure;

FIG. 2 illustrates a resource grid during the duration of a slot;

FIG. 3 illustrates a self-contained slot structure;

FIG. 4 illustrates a wireless communication system supporting an unlicensed band;

FIG. 5 illustrates a method of occupying resources in an unlicensed band;

FIGS. 6 and 7 are flowcharts illustrating channel access procedures (CAPs) for signal transmission in an unlicensed band;

FIG. 8 illustrates a resource element group interlace (REG-interlace) according to an embodiment of the present disclosure;

FIG. 9 illustrates selection of minimum symbols in consideration of a demodulation reference signal (DMRS) according to an embodiment of the present disclosure;

FIGS. 10 and 11 are flowcharts according to an embodiment of the present disclosure; and FIGS. 12 to 15 illustrate devices according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region
DL control region+GP+UL region
DL region: (i) DL data region, (ii) DL control region+DL data region
UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

Uplink Channel Structure

The UE transmits a related signal through the following uplink channels, and the BS receives the related signal through the following uplink channels.

(1) Physical Uplink Shared Channel (PUSCH)

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

(2) Physical Uplink Control Channel (PUCCH)

The PUCCH delivers uplink control information (UCI), HARQ-ACK and/or scheduling request (SR). PUCCH is divided into short PUCCHs and long PUCCHs based on PUCCH transmission durations. Table 3 illustrates exemplary PUCCH formats. PUCCH formats

TABLE 3

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

1. Wireless Communication System Supporting Unlicensed Band

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 4(a), the LCC may be configured as a primary CC (PCC) and the UCC may be configured as a secondary CC (SCC). As illustrated in FIG. 4(b), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G system named New RAT (NR). The NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, subcarrier spacing (SCS), and so on). In recent years, data traffic has significantly increased with the advent of smart devices. Thus, the 3GPP NR system has also considered the use of an unlicensed band for cellular communication as in LAA of the legacy 3GPP LTE system. However, unlike the LAA, a NR cell in the unlicensed-band (NR U-cell) aims to support standalone operation. For example, PUCCH, PUSCH, and PRACH transmissions at the UE may be supported.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 4 illustrates that mp, a minimum CW, a maximum CW, a maximum channel occupancy time (MCOT), and an allowed CW size applied to a CAP vary according to channel access priority classes.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 5 shows that the values of $m_p$, a minimum CW, a maximum CW, a maximum channel occupancy time (MCOT), and allowed CW sizes, which are applied to the CAP, vary depending on channel access priority classes.

TABLE 5

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class $p \in \{1, 2, 3, 4\}$. Otherwise, the UE may increase $CW_p$ for every priority class $p \in \{1, 2, 3, 4\}$ to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1, \ldots n_w$, starting from the subframe (or slot) $n_0$ without a gap (the subframe (or slot) $n_w$ is the most recent subframe (or slot) before a subframe (or slot) $n_g-3$ in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

2. PUCCH Transmission in U-band

For NR U-band operation, it may be required that a UE transmits a PUCCH including UCI in UL. To transmit the PUCCH, the UE may need to perform CCA based on LBT before the PUCCH transmission. Herein, the CCA based on LBT or LBT operation may refer to the above-described CAP for signal transmission in the U-band.

In the U-band, the UE may fail in LBT for UL transmission (or CCA based thereon). When the PUCCH transmission is dropped due to the LBT failure at the UE, the UCI that the UE should transmit may be lost. Due to the loss of the UCI, the BS may not receive the UCI from the UE. The UCI loss may cause a serious problem to system performance.

To avoid such a problem, it may be considered that for transmission of a single PUCCH in the U-band, a plurality of candidate starting symbols and/or a plurality of candidate PUCCH resources time division multiplexed (TDMed) in the time domain are configured for one PUCCH resource (to allow multiple LBT attempts). In addition, a plurality of candidate starting symbol sets and/or a plurality of candidate PUCCH resource sets TDMed in the time domain may be configured for one PUCCH resource.

Hereinabove, a description will be given of how the UE performs PUCCH transmission (in the U-band) depending on LBT results (e.g., CCA success or failure) when a plurality of candidate starting symbols and/or a plurality of candidate PUCCH resources are configured to transmit one PUCCH as described above. The PUCCH transmission may be performed based on one of the above-described PUCCH formats. While the proposed methods will be described in the context of the PUCCH transmission, the proposed methods may be similarly/equally applied to transmission of other UL channels (e.g., PUSCH) including the PUCCH.

(1) Embodiment 1

To provide multiple LBT opportunities in transmission of one PUCCH, various PUCCH resource configuration methods may be considered. In addition, various LBT-based PUCCH transmission operations may also be considered for each PUCCH resource configuration method.

As a PUCCH resource configuration method, a single PUCCH resource may be allocated for transmission of one PUCCH, and a plurality of candidate starting symbols (and/or a plurality of candidate starting symbol sets) may be configured on the corresponding single PUCCH resource.

In addition, a (minimum) symbol duration D may be configured for the single PUCCH resource. That is, when the UE transmits on the single PUCCH resource, the UE may require at least the symbol duration D in the time domain to transmit the PUCCH. When the PUCCH transmission is performed for the symbol duration D, starting from the latest candidate starting symbol, the last symbol index of the corresponding PUCCH is defined as X.

When a single PUCCH resource is configured, the UE may operate as follows. The UE may transmit the PUCCH for the symbol duration D in the time domain, starting from a candidate starting symbol where the LBT is first successful among a plurality of candidate starting symbols.

When a single PUCCH resource is configured, the UE may also operate as follows. The UE may transmit the PUCCH from a candidate starting symbol where the LBT is first successful among a plurality of candidate starting symbols to the symbol index X in the time domain.

When the UE transmits the PUCCH until the symbol index X in the time domain, UCI encoding (e.g., rate matching) may be applied with respect to the number of UCI transmission REs corresponding to the symbol duration D (in consideration of the number of coded bits corresponding to the number of REs).

When the UE transmits the PUCCH until the symbol index X in the time domain, if a symbol where the PUCCH transmission actually starts is ahead of the latest candidate starting symbol in the time domain, coded UCI bits may be repeatedly mapped and/or transmitted in a symbol duration corresponding to the gap between the symbol where the PUCCH transmission actually starts and the latest candidate starting symbol.

As another PUCCH resource configuration method, a plurality of candidate PUCCH resources (or a plurality of candidate PUCCH resource sets) TDMed in the time domain may be allocated.

When a plurality of candidate PUCCH resources are allocated, the resource index of a candidate PUCCH resource starting at the latest starting symbol may be defined as Y. Alternatively, Y may be defined as the resource index of a candidate PUCCH resource ending at the latest ending symbol.

When a plurality of candidate PUCCH resources are allocated, the UE may operate as follows. The UE may perform the PUCCH transmission on only one PUCCH resource where the LBT is first successful among the plurality of candidate PUCCH resources.

When a plurality of candidate PUCCH resources are allocated, the UE may also operate as follows. The UE may (repeatedly) transmit a single PUCCH over multiple PUCCH resources from a PUCCH resource where the LBT is first successful among the plurality of candidate PUCCH resources to the resource index Y.

When the above resource configuration methods and UE operations are defined, the UE may perform the PUCCH transmission as follows, based on a relationship between configured candidate starting symbols and/or candidate PUCCH resources, scheduling and/or transmission of other UL channels (e.g., PUSCH) including the PUCCH, and so on.

First, the UE may perform the PUCCH transmission differently based on the time interval between configured candidate PUCCH resources (e.g., adjacent PUCCH resources in the time domain).

For example, when the time interval between PUCCHs (each having the symbol duration D) starting at adjacent starting symbols is less than or equal to a specific level, the UE may transmit the PUCCH from a candidate starting symbol where the LBT is first successful to the symbol index X if a single PUCCH resource is configured. In addition, when the time interval between adjacent candidate PUCCH resources is less than or equal to a specific level, the UE may repeatedly transmit a single PUCCH over multiple PUCCH resources from a PUCCH resource where the LBT is first successful to the resource index Y if a plurality of candidate PUCCH resources TDMed in the time domain are allocated.

Herein, when the time interval between adjacent candidate PUCCH resources is less than or equal to a specific level, it may be interpreted to mean that the time-domain interval between the ending symbol of an earlier candidate PUCCH resource and the starting symbol of a later candidate PUCCH resource is less than or equal to the specific level. When the time-domain interval between the ending symbol of the earlier candidate PUCCH resource and the starting symbol of the later candidate PUCCH resource is more than or equal to the specific level, it may be defined that the time interval is more than or equal to the specific level.

In addition, when the time interval between PUCCHs (each having the symbol duration D) starting at adjacent starting symbols is less than or equal to a specific level, it may be interpreted to mean that the time interval between the candidate PUCCH resources (each having the symbol duration D) starting at the adjacent starting symbols has no gaps, i.e., a consecutive symbol relationship. In addition, when the time interval between the PUCCHs starting at the adjacent starting symbols has a gap, i.e., an inconsecutive symbol relationship, it may be defined that the time interval between the PUCCHs (each having the symbol duration D) starting at the adjacent starting symbols is more than or equal to the specific level.

When a single PUCCH resource is configured, if the time interval between PUCCHs (each having the symbol duration D) starting at adjacent starting symbols is more than the specific level, the UE may transmit the PUCCH for the symbol duration D in the time domain, starting from a candidate starting symbol where the LBT is first successful among a plurality of candidate starting symbols. When multiple candidate PUCCH resources TDMed in the time domain are allocated, if the time interval between adjacent candidate PUCCH resources is more than a specific threshold, the UE may perform the PUCCH transmission on only one PUCCH resource where the LBT is first successful among a plurality of candidate PUCCH resources.

If the UE transmits the PUCCH from a candidate starting symbol where the LBT is first successful among a plurality of candidate starting symbols to the symbol index X in the time domain, a specific UL channel may be scheduled and/or transmitted adjacent to the ending symbol index X. For the specific UL channel adjacent to the ending symbol index X, the UE may drop predetermined and/or indicated LBT operation and transmit the specific UL channel.

When the UE repeatedly transmits a single PUCCH over multiple PUCCH resources from a PUCCH resource where the LBT is first successful to the resource index Y, a specific UL channel may be scheduled and/or transmitted adjacent to the latest PUCCH resource index Y. For the specific UL channel adjacent to the PUCCH resource index Y, the UE may drop predetermined and/or indicated LBT operation and transmit the specific UL channel.

Second, the UE may perform the PUCCH transmission differently based on not only the time interval between configured candidate PUCCH resources but also scheduling and/or transmission of a UL channel adjacent to configured candidate PUCCH resource(s) (e.g., latest candidate PUCCH resource).

For example, if a single PUCCH resource is configured, a specific UL channel may be scheduled and/or transmitted adjacent to the ending symbol index X. When the specific UL channel is scheduled and/or transmitted adjacent to the ending symbol index X, the UE may transmit the PUCCH from a candidate starting symbol where the LBT is first successful among a plurality of candidate starting symbols to the symbol index X in the time domain. When no specific UL channel is scheduled and/or transmitted adjacent to the ending symbol index X, the UE may transmit the PUCCH for the symbol duration D in the time domain, starting from the candidate starting symbol where the LBT is first successful among the plurality of candidate starting symbols.

When a plurality of candidate PUCCH resources TDMed in the time domain are allocated, a specific UL channel may be scheduled and/or transmitted adjacent to the latest PUCCH resource index Y. When the specific UL channel is scheduled and/or transmitted adjacent to the latest PUCCH resource index Y, the UE may repeatedly transmit a single PUCCH over multiple PUCCH resources from a PUCCH resource where the LBT is first successful among the plurality of candidate PUCCH resources to the resource index Y. When no specific UL channel is scheduled and/or transmitted adjacent to the latest PUCCH resource index Y, the UE may perform the PUCCH transmission only one PUCCH resource where the LBT is first successful among the plurality of candidate PUCCH resources.

When a specific UL channel is adjacent to the ending symbol index X or the latest PUCCH resource index Y, it may be interpreted to mean that the time-domain interval between the specific UL channel and the ending symbol index X or latest PUCCH resource index Y is less than or equal to a specific level. For example, the specific UL channel and the ending symbol index X or latest PUCCH resource index Y may be a consecutive symbol relationship without any time gaps.

When a specific UL channel is adjacent to the ending symbol index X or the latest PUCCH resource index Y, the UE may drop predetermined and/or indicated LBT operation and transmit the specific UL channel (after performing the LBT and PUCCH Transmission).

Third, the UE may perform the PUCCH transmission differently according to a configuration by RRC signaling or an indication by DCI signaling (e.g., DL grant).

For example, if a single PUCCH resource is configured, RRC or DCI signaling may configure and/or indicate whether the UE needs to transmit the PUCCH from a candidate starting symbol where the LBT is first successful to the symbol index X in the time domain or transmit the PUCCH from for the symbol duration D in the time domain, starting from the candidate starting symbol where the LBT is first successful. When a plurality of candidate PUCCH resources TDMed in the time domain are allocated, the RRC or DCI signaling may configure and/or indicate whether the UE needs to repeatedly transmit a single PUCCH over multiple PUCCH resources from a PUCCH resource where the LBT is first successful among the plurality of candidate PUCCH resources to the resource index Y or perform the PUCCH transmission on only the (one) PUCCH resource where the LBT is first successful among the plurality of candidate PUCCH resources.

When the UE transmits the PUCCH from a candidate starting symbol where the LBT is first successful among a plurality of candidate starting symbols to the symbol index X in the time domain, a specific UL channel may be scheduled and/or transmitted adjacent to the ending symbol index X. For the specific UL channel adjacent to the ending symbol index X, the UE may drop predetermined and/or indicated LBT operation and transmit the specific UL channel.

When the UE repeatedly transmits a single PUCCH over multiple PUCCH resources from a PUCCH resource where the LBT is first successful among a plurality of candidate PUCCH resources to the resource index Y, a specific UL channel may be scheduled or transmitted adjacent to the latest PUCCH resource index Y. For the specific UL channel adjacent to the (latest) PUCCH resource index Y, the UE may drop predetermined and/or indicated LBT operation and transmit the specific UL channel.

(2) Embodiment 2

For one PUCCH resource, the number of RBs included in the PUCCH resource (N_RB), the number of symbols included in the PUCCH resource (N_sym), and a maximum UCI coding rate for the PUCCH resource (R_max) may be configured in the NR system. A maximum UCI payload size capable of being transmitted on the PUCCH resource (U_max) may be calculated based on the number of UCI transmission REs, which is calculated by {the number of RBs, the number of symbols}. As an operation defined as "F-resource Adaptation", if an actual UCI payload size required for actual transmission (U_act) is less than U_max, the UE may be configured to use a minimum number of RBs available for U_act transmission (less than or equal to N_RB) among all RBs included in the PUCCH resource in performing PUCCH transmission.

For example, U_act may be defined as follow: U_act= ($O_{ACK}+O_{SR}+O_{CSI-part1}$ $O_{CRC, CSI-part1}$). In this case, each parameter for calculating U_act may be defined as shown in Table 6 below.

TABLE 6

| | |
|---|---|
| $O_{ACK}$ | a total number of HARQ-ACK information bits |
| $O_{SR}$ | a total number of SR bits |
| $O_{CSI-part1,n}$ | a number of Part 1 CSI report bits for CSI report with priority value n |
| $O_{CSI-part2,n}$ | a number of Part 2 CSI report bits for CSI report with priority value n |
| $O_{CRC,CSI-part1}$ | a number of CRC bits for encoding HARQ-ACK, SR and Part 1 CSI report bit |
| $O_{CRC,CSI-part2}$ | a number of CRC bits for encoding Part 2 CSI report bits |

$O_{CRC} = O_{CRC,CSI-part1} | O_{CRC,CSI-part2}$

U_act may be calculated by some of the parameters of Table 6. For example, U_max may be calculated by U_max=N_RB×N_sym×N_SC×Qm×R_max, where N_SC is the number of subcarriers per RB, and Qm is a parameter value determined depending on modulation schemes. When U_act≤U_max, the UE may select a minimum value of N_RB, N_RB,min capable of satisfying the following relationship: U_act≤N_RB,min×N_sym×N_SC×Qm×R_max, and then transmit the PUCCH.

When an RE group consisting of a plurality of consecutive REs in the frequency domain is defined in an NR U-band (e.g., 6 REs or 12 REs=1 RB), a set of multiple inconsecutive RE groups in the frequency domain may be defined as a resource unit for transmitting one PUCCH in consideration of regulations on occupied channel bandwidth (OCB) and power spectral density (PSD). Each set of multiple inconsecutive RE groups may be located at a regular or irregular interval. The set of RE groups, i.e., the resource unit for transmitting one PUCCH may be defined as an REG-interlace. The REG-interlace may be referred to as an RB-interlace. In an NR U-band environment, one PUCCH transmission resource may be configured as shown in FIG. 8. FIG. 8 illustrates that a resource unit for transmitting one PUCCH consists of and/or is configured with REG-interlace(s). In FIG. 8, one PUCCH may be transmitted in one RB-interlace. However, a resource for transmitting one PUCCH may include and/or be configured with a plurality of REG-interlaces. When the F-resource adaptation operation is applied to a PUCCH resource consisting of and/or configured with REG-interlace(s) in the frequency domain, there may be a problem regarding the regulations on OCB and PSD in the U-band or the efficiency may be degraded (because some REGs included in the interlace(s) constituting the PUCCH resource may be dropped).

For example, when a specific UE transmits the PUCCH in one REG-interlace in a specific U-band, there may be another UE that desires to use the corresponding U-band. In this case, the other UE may recognize a frequency band occupied by the specific UE and determine whether the corresponding frequency band is busy or idle, based on an RB with the highest frequency index and an RB with the lowest frequency index. If the specific UE performs the F-resource adaptation operation, RBs with the highest frequency index or RBs with the lowest frequency index may not be used for the PUCCH transmission. That is, the specific UE may not occupy a frequency band higher than a specific level for the PUCCH transmission. In this case, the other UE may not detect that the corresponding U-band is busy due to the PUCCH transmission at the specific UE.

Therefore, the UE may be configured to determine and/or reduce the number of time-domain symbols adaptively depending on UCI payload sizes (instead of employing the F-resource adaptation) when performing the PUCCH transmission on the PUCCH resource consisting of and/or configured with REG-interlace(s). For convenience, one REG may be assumed to be one RB. When {N_RB, N_sym, R_max} are configured for one PUCCH resource, if U_act<U_max, the UE may be configured to use a minimum number of symbols available for U_act transmission among all symbols included in the PUCCH resource as an operation defined as "T-resource adaptation" (in this case, the UE may use a total of N_RB RBs). Thus, the number of symbols used for actual PUCCH transmission depending on UCI payload sizes may be less than N_sym (configured for the PUCCH resource). For example, the UE may transmit the PUCCH by selecting a minimum value N_sym,min capable of satisfying the following relationship: U_act≤N_RB×N_sym,min× N_SC×Qm×R_max.

When the minimum number of symbols available for U_act transmission is determined, symbol(s) may be dropped from the last symbol in the time domain among N_sym symbols for the PUCCH transmission.

Among the N_sym symbols for the PUCCH transmission, a starting symbol may be included in a resource selected for the PUCCH transmission from among a plurality of candidate PUCCH resources according to LBT results of Embodiment 1. Alternatively, the starting symbol among the N_sym symbols for the PUCCH transmission may be a starting symbol selected for the PUCCH transmission from among a plurality of starting symbols according to the LBT results of Embodiment 1.

When symbol(s) are dropped from the last symbol in the time domain among the N_sym symbols for the PUCCH transmission, the T-resource adaptation may be performed in consideration of the location of a DMRS symbol related to the PUCCH. The DMRS symbol may mean a symbol in which the DMRS is transmitted.

For example, the minimum number of symbols available for U_act transmission is 2, DMRSs may be located before and/or after the minimum number of symbols available for U_act transmission in the time domain as shown in FIG. 9 (a).

When DMRSs are located before and after the minimum number of symbols available for U_act transmission in the time domain as shown in FIG. 9 (b), the UE may not use symbols from the last symbol in the time domain among the N_sym symbols to a symbol next to the minimum number of symbols available for U_act transmission to transmit the PUCCH. In other words, when a DMRS is located in a symbol before the minimum number of symbols available for U_act transmission, a DMRS located in a symbol after the minimum number of symbols available for U_act transmission may be dropped.

When a DMRS is located in a symbol after the minimum number of symbols available for U_act transmission as shown in FIG. 9 (c), the UE may not use symbols from the last symbol in the time domain among the N_sym symbols to a symbol after the DMRS symbol (i.e., a symbol after the minimum number of symbols available for U_act transmission) to transmit the PUCCH. In other words, when no DMRS is located in a symbol before the minimum number of symbols available for U_act transmission, the DMRS located in the symbol after the minimum number of symbols available for U_act transmission may not be dropped.

As shown in FIGS. 9 (b) and (c), the UE may not use symbols from the last symbol in the time domain among the N_sym symbols except the first DMRS symbol in the time domain among the minimum number of symbols available for U_act transmission and symbols adjacent to the minimum number of symbols available for U_act transmission to transmit the PUCCH. In other words, the UE may use the first DMRS symbol in the time domain among the minimum number of symbols available for U_act transmission and the symbols adjacent to the minimum number of symbols available for U_act transmission for the PUCCH transmission. Assuming that symbol duration A includes symbols from the first symbol to the first DMRS symbol in a configured PUCCH resource and symbol duration B includes symbols from the first symbol to the minimum number of symbols available for U_act transmission in the configured PUCCH resource, a symbol duration used by the UE to actually transmit the PUCCH for U_act may be determined by the maximum one of symbol durations A and B.

Additionally, a specific UE may be configured to combine and apply the F-resource adaptation and T-resource adaptation. For example, when N_RB is more than or equal to a specific level (N_th), the UE may first apply the F-resource adaptation operation for the number of RBs more than or equal to N_th if U_act≤U_max. Additionally, the UE may apply the T-resource adaptation operation for the number of RBs corresponding to N_th if U_act<U_max. For example, the UE may select a minimum value of N_sym, N_sym, min2 capable of satisfying the following relationship: U_act≤N_RB,th×N_sym,min2×N_SC×Qm×R_max and transmit the PUCCH, where N_RB,th is the threshold of N_RB and may be determined with respect to N_th. Since a specific UE may maintain N_RB to be more than or equal to N_RB,th while transmitting the PUCCH, another UE may recognize that a corresponding U-band is busy. In another example, when N_RB includes a plurality of REG-interlaces, if U_act<U_max, the UE may first apply the F-resource adaptation operation on an REG-interlace basis (rather than an RB basis). If U_act<U_max still, the UE may additionally apply the T-resource adaptation operation even for one REG-interlace.

(3) Embodiment 3

In an NR U-band environment, it may be considered that for one PUCCH resource, a plurality of different (candidate) starting symbol indices are configured while the ending symbol index is fixed. In this case, the symbol duration for PUCCH transmission may decrease as the starting symbol index increases. Since the UCI coding rate may increase for a given UCI payload size or the maximum UCI payload size may decrease for a given UCI coding rate, the performance may be degraded. Thus, for a given PUCCH resource, the present disclosure proposes to determine the maximum UCI payload size (U_max), perform the LBT, and/or perform the PUCCH transmission as follows in consideration of the phenomenon.

First, the UCI payload size U_max may be determined with respect to the latest candidate starting symbol (or latest candidate starting symbol index) in the time domain.

When U_max is determined with respect to the latest candidate starting symbol, the UE may calculate U_max based on the maximum coding rate R_max and the number of UCI transmission REs calculated by assuming that the PUCCH transmission uses the earliest starting symbol and fixed ending symbol.

When U_max is calculated with respect to the latest candidate starting symbol, UCI encoding (e.g., rate matching) may be applied with respect to the number of UCI transmission REs (in consideration of the number of coded bits corresponding to the number of REs).

When U_max is calculated with respect to the latest candidate starting symbol, if a starting symbol where the PUCCH transmission actually starts is ahead of the latest candidate starting symbol in the time domain, coded UCI bits may be repeatedly mapped and/or transmitted in a symbol duration corresponding to the gap between the starting symbol where the PUCCH transmission actually starts and the latest candidate starting symbol.

When U_max is calculated with respect to the latest candidate starting symbol, all configured candidate starting symbols may be valid. In this case, the UE may perform the LBT sequentially for the candidate starting symbols (until the LBT is successful).

The UCI payload size U_max may be determined with respect to the earliest candidate starting symbol (or the earliest candidate starting symbol index) in the time domain.

When U_max is determined with respect to the earliest candidate starting symbol, the UE may calculate U_max based on the maximum coding rate R_max and the number of UCI transmission REs calculated by assuming that the PUCCH transmission uses the earliest starting symbol and fixed ending symbol.

When U_max is determined with respect to the earliest candidate starting symbol, UCI encoding (e.g., rate matching) may be applied with respect to the number of UCI transmission REs (in consideration of the number of coded bits corresponding to the number of REs).

When U_max is calculated with respect to the earliest candidate starting symbol, if a starting symbol where the PUCCH transmission actually starts is behind the earliest candidate starting symbol, coded UCI bits may be punctured in a symbol duration corresponding to the gap between the starting symbol where the PUCCH transmission actually starts and the earliest candidate starting symbol.

When U_max is calculated with respect to the earliest candidate starting symbol, some candidate starting symbols configured based on U_act, which is the actual UCI payload size required for actual transmission, may be valid. The valid candidate starting symbols may be some candidate starting symbols with the earliest indices in the time domain. The UE may perform the LBT sequentially only for the valid candidate starting symbols (until the LBT is successful).

If the UE fails in the LBT for all valid starting symbols regardless of how U_max is determined, the UE may drop the PUCCH transmission.

The valid starting symbol may be determined based on whether the UCI coding rate exceeds R_max on the assumption of U_act transmission to which a starting symbol index more than or equal to a specific symbol index is applied. Alternatively, the valid starting symbol may be determined based on whether the UCI coding rate is less than or equal to R_max on the assumption of U_act transmission to which a starting symbol index less than the specific symbol index is applied.

(4) Embodiment 4

In an NR U-band environment, when the time gap (or timing gap) between a DL transmission ending symbol (DL ending symbol) and a UL transmission starting symbol (UL starting symbol) adjacent thereto is less than or equal to a specific level (e.g., 16 usec), the UE may be allowed to skip the LBT and start and/or perform UL transmission with no LBT within a COT duration started/occupied with DL transmission resulting from the LBT performed by the BS (when the LBT is successful) if the UE is configured with the corresponding UL transmission.

For example, if the time gap between a time at which DL grant DCI and/or PDSCH transmission ends and a time at which HARQ-ACK transmission (over the PUCCH or PUSCH) for the corresponding PDSCH reception starts is less than or equal to 16 usec, the UE may perform the HARQ-ACK transmission with no LBT. In another example, when the time gap between a time at which UL grant DCI transmission ends and a time at which PUSCH transmission scheduled by the corresponding DCI starts is less than or equal to 16 usec, the UE may perform the corresponding PUSCH transmission with no LBT.

The minimum processing time (for decoding/encoding) of the UE required for PDSCH-to-HARQ-ACK or PDCCH-to-PUSCH transmission may be more than the specific level (e.g., 16 usec) in consideration of UE implementation. If a DL-to-UL switching time is more than 16 usec, it may be regulated that the UE should perform the LBT before UL transmission. Even when the time required for PDSCH-to-HARQ-ACK or PDCCH-to-PUSCH switching is more than 16 usec due to the UE processing time, transmission of a specific DL or UL signal/channel may be added and/or indicated between the PDSCH and HARQ-ACK or between the PDCCH and PUSCH. As a result, the time gap between total DL and UL durations may be less than or equal to 16 usec, thereby allowing the UE to skip the LBT and perform the HARQ-ACK or PUSCH transmission with no LBT.

To reduce the time gap between the total DL and UL durations below 16 usec, the UE may additionally transmit a specific UL signal/channel during a period between a PDSCH ending symbol scheduled by DL grant DCI and a HARQ-ACK starting symbol (within a gNB-initiated COT). That is, it may be considered that the UE is instructed to transmit a specific UL signal/channel and a HARQ-ACK therefor continuously with no time gap. The specific UL signal/channel transmitted by the UE to reduce the time gap between the total DL and UL durations below 16 usec may be referred to as "Gap-Signal (Gap-Sig)" or "Gap-Channel (Gap-CH)".

For example, when the time gap between a DL ending symbol including the PDSCH and a Gap-Sig symbol is less than or equal to the specific level (e.g., 16 usec), the UE may skip the LBT and continuously transmit the Gap-Sig and HARQ-ACK with no LBT. Alternatively, when the UE is instructed not to perform the LBT by DCI, the UE may skip the LBT and continuously transmit the Gap-Sig and HARQ-ACK with no LBT. When the time gap between the DL ending symbol including the PDSCH and the Gap-Sig symbol is more than the specific level (e.g., 16 usec) (more particularly, when the time gap is more than or equal to 25 usec), the UE may continuously transmit the Gap-Sig and HARQ-ACK by performing Category 2 (Cat-2) LBT in a 25-usec short CCA gap. Alternatively, when the UE is instructed to perform the Cat-2 LBT by DCI, the UE may continuously transmit the Gap-Sig and HARQ-ACK by performing the Cat-2 LBT in the 25-usec short CCA gap.

To reduce the time gap between the total DL and UL durations below 16 usec, the UE may additionally transmit the specific UL signal/channel during a period between a PDCCH ending symbol carrying UL grant DCI and a PUSCH starting symbol scheduled by the corresponding DCI (within the gNB-initiated COT). To allow the UE to additionally transmit the Gap-Sig, the UE may be instructed to continuously transmit the Gap-Sig and PUSCH with no time gap.

For example, when the time gap between a DL ending symbol including the PDCCH and a Gap-Sig starting symbol is less than or equal to the specific level (e.g., 16 usec), the UE skip the LBT and continuously transmit the Gap-Sig and PUSCH with no LBT. Alternatively, when the UE is instructed not to perform the LBT by DCI, the UE may skip the LBT and continuously transmit the Gap-Sig and PUSCH with no LBT. When the time gap between the DL ending symbol including the PDCCH and the Gap-Sig starting symbol is more than the specific level (e.g., 16 usec) (more particularly, when the time gap is more than or equal to 25 usec), the UE may continuously transmit the Gap-Sig and PUSCH by performing the Cat-2 LBT in the 25-usec short CCA gap. Alternatively, when the UE is instructed to perform the Cat-2 LBT by DCI, the UE may continuously transmit the Gap-Sig and PUSCH by performing the Cat-2 LBT in the 25-usec short CCA gap.

The Gap-Sig may include consecutive symbols where a plurality of UL channels/signals (e.g., a PUCCH carrying an SR, a PUCCH/PUSCH carrying a CSI report, a PUSCH carrying a UL-SCH, an SRS for UL channel estimation, etc.) are present (TDMed) with no time gap (Opt 1). Alternatively, the Gap-Sig may be formed such that a plurality of candidate starting symbols or a plurality of candidate ending symbols are configured for one UL channel/signal (Opt 2).

A channel/signal to be actually transmitted among the plurality of UL channels/signals configured for the single Gap-Sig in Opt 1 and the location of a starting and ending symbol to be applied to actual transmission in Opt 2 may vary depending on the time gap between a DL ending symbol including the PDSCH and a HARQ-ACK starting symbol or the time gap between a DL ending symbol including the PDCCH and a PUSCH starting symbol. For example, in Opt 1, the number of (consecutive) channels/signals to be transmitted may decrease as the corresponding time gap decreases. In Opt 2, as the corresponding time gap decreases, the starting symbol may be located further behind in the time domain or the ending symbol may be located further ahead in the time domain.

In Opt 1, among the plurality of (TDMed) UL channels/signals configured for the single Gap-Sig, a starting or ending channel/signal may be indicated by DL/UL grant DCI. In Opt 2, the starting or ending symbol of the Gap-Sig may be indicated by the DL/UL grant DCI. In this case, a symbol next to the Gap-Sig ending symbol may be determined as the starting symbol of the PUSCH or HARQ-ACK. Alternatively, when the PUSCH or HARQ-ACK starting symbol is indicated by the DL/UL grant DCI, a symbol before the corresponding may be determined as the Gap-Sig ending symbol. The starting channel/signal or starting symbol of the Gap-Sig may be indicated by DCI with respect to the HARQ-ACK/PUSCH starting symbol (as a relative location to the corresponding starting symbol or in the form of an offset for the corresponding symbol). It may be regulated that the same Gap-Sig related information is included in multiple DL grant DCIs indicating the same HARQ-ACK transmission timing. For example, Gap-Sig related information may include the presence of Gap-Sig transmission, combination of starting/ending channels/signals constituting the Gap-Sig, and/or starting/ending symbol location of the Gap-Sig. Multiple DL grant DCIs indicating HARQ-ACK transmission timings may be for the same UE.

Implementation Example

One or more of the above-described operations may be organically combined to implement embodiments of the present disclosure.

One of embodiments implemented by a combination of the operations described in the present disclosure may be given as illustrated in FIG. 10.

A BS provides a UE with resource configuration information for PUCCH transmission at the UE (S110). The resource configuration information may be transmitted by DCI (or a PDCCH signal) or RRC signaling. The corresponding resource configuration information may include all information for supporting the above-described PUCCH transmission.

The UE transmits a PUCCH signal to the BS based on the received resource configuration information and a CAP (or LBT) for a U-band (S120). The expression of "based on a CAP (or LBT) on a U-band)" may imply that the UE may recognize that the corresponding U-band is available based on the CAP (or LBT) for the corresponding U-band and transmit a related signal in the corresponding U-band. In this case, the UE may transmit the PUCCH signal according to the above-described embodiments.

FIG. 11 shows one of the embodiments that may be implemented by any combination of the above-described operations.

Referring to FIG. 11, an embodiment of the present disclosure, which may be performed by a communication device, may include configuring an REG-interlace for PUCCH transmission (S1101) and transmitting a PUCCH by selecting a minimum number ($N_{min}$) of symbols required for the PUCCH transmission from among N symbols (S1103). The REG-interlace may include M RBs and the N symbols. The minimum number ($N_{min}$) of symbols required for the PUCCH transmission may be selected based on that an actual UCI payload size required for the PUCCH transmission is less than a maximum UCI payload size capable of being transmitted on a PUCCH resource.

The maximum UCI payload size may be calculated based on M×N×N_SC×Qm×R_max, where M=N_RB and N=N_sym. The details of N_SC, Qm, and R_max have been described in Embodiment 2. The communication device may select as $N_{min}$ a minimum value of N satisfying that the maximum UCI payload size is more than or equal to the actual UCI payload size.

When $N_{min}$ is selected, M may be fixed. Alternatively, $N_{min}$ may be selected based on that the actual UCI payload size is less than the maximum UCI payload size, which is calculated based on $M_{th}$ RBs after M is reduced to a specific threshold $M_{th}$.

In addition, the PUCCH may be transmitted in the minimum number of symbols for the PUCCH transmission and DMRS symbols adjacent to the minimum number of symbols. Transmission of DMRS symbols not located first in the time domain among the DMRS symbols adjacent to the minimum number of symbols may be dropped. In other words, the PUCCH may be transmitted in the minimum number of symbols for the PUCCH transmission and a DMRS symbol that is adjacent to the minimum number of symbols and located first in the time domain.

In addition to the above-described operation of FIG. 11, one or more of the operations described before with reference to FIGS. 1 to 10 may further be performed in combination.

Example of Communication System to Which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 12 illustrates a communication system 1 applied to the present disclosure.

Referring to FIG. 12, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to Which the Present Disclosure is Applied

FIG. 13 illustrates wireless devices applicable to the present disclosure.

Referring to FIG. 13, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to Which the Present Disclosure is Applied

FIG. 14 illustrates another example of a wireless device applied to the present disclosure. The wireless device may be implemented in various forms according to a use case/service (refer to FIG. 12).

Referring to FIG. 14, wireless devices 100 and 200 may correspond to the wireless devices 100 and 200 of FIG. 13 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcasting terminal, a hologram device, a public safety device, an MTC device, a medical device, a FinTech device (or a finance device), a security device, a climate/environment device, the AI server/device (400 of FIG. 12), the BSs (200 of FIG. 12), a network node, or the like. The wireless device may be mobile or fixed according to a use case/service.

In FIG. 14, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to Which the Present Disclosure is Applied FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:
1. A method of transmitting and receiving a signal by a communication device in a wireless communication system, the method including:

configuring an interlace including M resource blocks (RBs) and N symbols for transmission of a physical uplink control channel (PUCCH); and based on that an actual uplink control information (UCI) payload size required for the PUCCH transmission is smaller than a maximum UCI payload size capable of being transmitted on a PUCCH resource, transmitting the PUCCH by selecting a minimum number ($N_{min}$) of symbols required for the PUCCH transmission among the N symbols, wherein the minimum number of symbols are selected to be adjacent to a location of demodulation reference signal (DMRS) symbols, and wherein transmission of DMRS symbols not located first in a time domain among the DMRS symbols adjacent to the minimum number of symbols is dropped.

2. The method of claim 1, wherein the maximum UCI payload size is calculated based on M×N×N_SC×Qm× R_max, where N_SC denotes a number of subcarriers for each RB, Qm denotes a parameter configured based on a modulation scheme, and R_max denotes a maximum UCI coding rate, and wherein the communication device selects $N_{min}$ as a minimum value of N satisfying that the maximum UCI payload size is greater than or equal to the actual UCI payload size.

3. The method of claim 1, wherein the communication device selects $N_{min}$ by dropping transmission from a symbol located last in a time domain among the N symbols.

4. The method of claim 1, wherein the communication device selects $N_{min}$ while M is unchanged.

5. The method of claim 1, wherein the communication device reduces the M RBs for the PUCCH transmission to a threshold ($M_{th}$), and wherein the communication device selects $N_{min}$ based on that the actual UCI payload size is smaller than a maximum UCI payload size calculated based on $M_{th}$ RBs.

6. A communication device for transmitting and receiving a signal in a wireless communication system, the communication device comprising:
at least one transceiver;
at least one processor; and
at least one memory operably connected to the at least one processor and configured to store instructions that, when executed, cause the at least one processor to perform operations comprising:

configuring an interlace including M resource blocks (RBs) and N symbols for transmission of a physical uplink control channel (PUCCH); and based on that an actual uplink control information (UCI) payload size required for the PUCCH transmission is smaller than a maximum UCI payload size capable of being transmitted on a PUCCH resource, transmitting the PUCCH by selecting a minimum number ($N_{min}$) of symbols required for the PUCCH transmission among the N symbols, wherein the minimum number of symbols are selected to be adjacent to a location of demodulation reference signal (DMRS) symbols, and wherein transmission of DMRS symbols not located first in a time domain among the DMRS symbols adjacent to the minimum number of symbols is dropped.

7. The communication device of claim 6, wherein the maximum UCI payload size is calculated based on M×N× N_SC×Qm×R_max, where N_SC denotes a number of subcarriers for each RB, Qm denotes a parameter configured based on a modulation scheme, and R_max denotes a maximum UCI coding rate, and wherein the processor is configured to select $N_{min}$ as a minimum value of N satisfying that the maximum UCI payload size is greater than or equal to the actual UCI payload size.

8. The communication device of claim 6, wherein the processor is configured to select $N_{min}$ by dropping transmission from a symbol located last in a time domain among the N symbols.

9. The communication device of claim 6, wherein the processor is configured to select $N_{min}$ while M is unchanged.

10. The communication device of claim 6, wherein the processor is configured to reduce the M RBs for the PUCCH transmission to a threshold ($M_{th}$) and selects $N_{min}$ based on that the actual UCI payload size is smaller than a maximum UCI payload size calculated based on $M_{th}$ RBs.

11. The communication device of claim 6, wherein the communication device includes an autonomous driving vehicle configured to communicate at least with a terminal, a network, and another autonomous driving vehicle other than the communication device.

* * * * *